United States Patent [19]

Bertrand

[11] Patent Number: 4,912,377
[45] Date of Patent: Mar. 27, 1990

[54] DEVICE FOR DRIVING SEVERAL CABLES OF A TRANSPORTATION INSTALLATION OPERATING IN SYNCHRONISM AND METHOD FOR THE AUTOMATIC REGULATION OF THE SYNCHRONOUS DRIVE OF THESE CABLES

[75] Inventor: Jean-Jacques Bertrand, Sassenage, France

[73] Assignee: Pomagalski, S.A., Fontaine, France

[21] Appl. No.: 197,982

[22] Filed: May 24, 1988

[30] Foreign Application Priority Data

May 27, 1987 [FR] France ................... 87 07653

[51] Int. Cl.$^4$ .................................. H02P 5/46
[52] U.S. Cl. .......................... 318/77; 318/59; 318/68
[58] Field of Search .............. 318/51, 53, 59, 66, 318/67, 68, 69, 70, 71, 75, 77, 105

[56] References Cited

U.S. PATENT DOCUMENTS

| | | | |
|---|---|---|---|
| 3,760,246 | 9/1973 | Gurwicz | 318/52 |
| 3,789,280 | 1/1974 | Oldfield | 318/71 X |
| 4,308,489 | 12/1981 | Bergmann | 318/105 X |
| 4,509,430 | 4/1985 | Creissels | 104/173 |
| 4,619,206 | 10/1986 | Creissels | 104/178 |

FOREIGN PATENT DOCUMENTS

| | | | |
|---|---|---|---|
| 61-22785 | 1/1986 | Japan | 318/69 |
| 1164117 | 6/1985 | U.S.S.R. | 318/77 |
| 2024464 | 1/1980 | United Kingdom | 318/77 |
| 2026210 | 1/1980 | United Kingdom | 318/66 |

Primary Examiner—Bentsu Ro
Attorney, Agent, or Firm—Fred A. Keire

[57] ABSTRACT

A technique for driving with continuous synchronized movement a plurality of parallel pulling cables of a transportation installation in a direction parallel to the cables comprising at least one vehicle connected in line to the cables. Each cable is driven by a separate independent drive device powered by a dedicated power source. Drive forces in each drive device are monitored and used to control the drive device speed of at least one drive device so as to maintain equal cable speeds.

18 Claims, 1 Drawing Sheet

DEVICE FOR DRIVING SEVERAL CABLES OF A TRANSPORTATION INSTALLATION OPERATING IN SYNCHRONISM AND METHOD FOR THE AUTOMATIC REGULATION OF THE SYNCHRONOUS DRIVE OF THESE CABLES

BACKGROUND OF THE INVENTION

1. Field of the Invention

The invention relates to the drive with continuous movement in synchronism in the same direction of several parallel, at least pulling cables of a transportation installation comprising in operation at least one vehicle connected in line to the said at least pulling cables.

2. Description of the Prior Art

It is already known that one of the problems encountered in the construction of a transportation installation having several aerial supporting/pulling cables comprising at least one vehicle connected to all these supporting/pulling or pulling cables, resides in the necessity of driving the cables in perfect synchronism.

One solution has been proposed in French Patent No. 2 430 901 which recommends perfectly identical loops of cable, a connection of each vehicle to the cables by two pairs of grippers in order to form a rigid quadrilateral imposing the synchronous drive of the cables and a mechanical, hydraulic or electrical differential device in the vicinity of the drive motors. However, this solution was not satisfactory since it required absolutely identical loops of cable, which is never the case in practice, on account of the constraints of the trajectories which it is not always possible to respect.

European Patent No. 93.680 also teaches that it is necessary to provide two absolutely identical loops of cable, to form a rigid quadrilateral for the connection of the vehicles to the cables and to drive the cables by two strictly identical d.c. motors supplied from the same electrical supply source providing constant power by virtue of an electrical differential device. French Patent No. 2 552 716 recommends how one can construct such an electrical differential by incorporating in series resistances of fixed value in the induced circuits of the two motors, supplied in parallel from the same d.c. source. Here too, it has been found that it is not possible in practice to produce two identical loops of cable. Furthermore, the electrical differential produced by the resistances has proved to be the subject of resonance phenomena and one drawback thereof is that it is not possible to control the electrical supply of each motor. It has thus been found in practice that the cabins suspended from the cables are sometimes subject to swinging movements of great amplitude in a transverse plane with respect to the cables, which is detrimental to the comfort and safety of the passengers. Moreover, tests carried out with the differential device according to French Patent No. 2 552 726 on installations having a winding course have shown that such a device is absolutely inadequate for ensuring a synchronous drive of the two cables.

SUMMARY OF THE INVENTION

The invention thus intends to remedy the above-mentioned drawbacks of known installations and its object is to ensure the synchronous drive of several at least pulling cables of a transportation installation comprising cables and this is when the loops of cable are different, for example when the course of the installation is winding or distorted. Another object of the invention is to completely eliminate the phenomena of resonance or parasite phenomena between the means for driving the cables. Another object of the invention is to facilitate the checking and control of the drive of one loop of cable independently of the others.

To do this, the invention proposes a drive device for the continuous movement in synchronism in the same direction of several parallel, at least pulling cables of a transportation installation comprising in operation at least one vehicle connected in line to the said at least pulling cables, characterised in that it comprises separate means for driving each cable independently of the others, separate power sources supplying each drive means independently of the others, means for controlling the drive speed of at least one drive means of a cable depending on the different drive forces of the different drive means, so that these different drive forces of the cables correspond to equal travelling speeds of the cables.

The invention also proposes a drive device for continuous movement in synchronism in the same direction of two parallel, supporting/pulling, endless aerial cables of a transportation installation with aerial cables, comprising in operation at least one vehicle connected in line—in particular a series of vehicles such as cabins regularly spaced and distributed along the line—to the said cables, characterised in that it comprises two independent, separate drive means, one for each cable, two separate power sources supplying each drive means independently of the other, means for the detection of a variation in the drive force of at least one cable with respect to the initial force for which the cables move at the same speed, which is their nominal speed and means emitting at least one signal S for the correction of the drive speed of at least one of the two cables, this signal S being proportional in absolute value to the variation detected in the drive force of at least one cable and correcting the speed in order to return the force to its initial value.

Preferably, the detection means are able to detect the variation in the force of each of the cables, and for example detect a variation D in the difference $\Delta E$ between the drive forces of the cables with respect to the initial difference $\Delta E_o$ between these forces for which the speeds of the cables are equal and the transmitting means emit a signal S for the correction of the speed, proportional in absolute value to this variation D, the correction taking place with the aim of cancelling-out the variation D.

The invention also relates to a method for the automatic regulation of the drive with continuous movement in synchronism in the same direction of several parallel, at least pulling cables of a transportation installation comprising in operation at least one vehicle connected in line to the said at least pulling cables, characterised in that since the said cables are driven to move independently of each other by drive devices and power sources belonging to each cable, the force necessary for the drive of each of the cables is measured permanently and the drive speed of at least one of the cables is controlled depending on the forces measured, so that the different forces necessary for the drive of the different cables correspond to equal speeds of movement of the cables.

The invention also relates to a method for the automatic regulation of the drive with continuous movement in synchronism in the same direction of two supporting/pulling, parallel, endless aerial cables of a transportation installation with aerial cables comprising in operation, at least one vehicle connected in line—in particular a series of vehicles regularly spaced and distributed along the line—to the said cables, characterised in that since each cable is driven by a drive device and a power source belonging to this cable and which are separate and independent from the drive device and power source belonging to the other cable, the force necessary for the drive of each cable is measured permanently, the difference ΔE between these forces is established and this measured difference ΔE is compared with an initial value ΔEo for which the speeds of the cables are equal and the drive speed of at least one of the two cables is corrected as soon as the measured difference ΔE is different from the initial difference ΔEo, in order to reestablish equality between these differences ΔE and ΔEo.

The invention thus makes it possible to obtain absolutely identical cable speeds and this is even when the cable loops are different. In addition, since the power supplies between the various drive means are separated and these drive means belong to each cable, one completely eliminates the phenomena of resonance or the parasite phenomena between these various drive means. In addition, with a device according to the invention, it is possible to control the drive of each cable independently of the others.

Further features and advantages of the invention will become apparent on reading the ensuing description referring to the accompanying drawing which is an electrical diagram of a drive device according to a preferred embodiment of the invention.

DESCRIPTION OF THE PREFERRED EMBODIMENT

Figure 1:
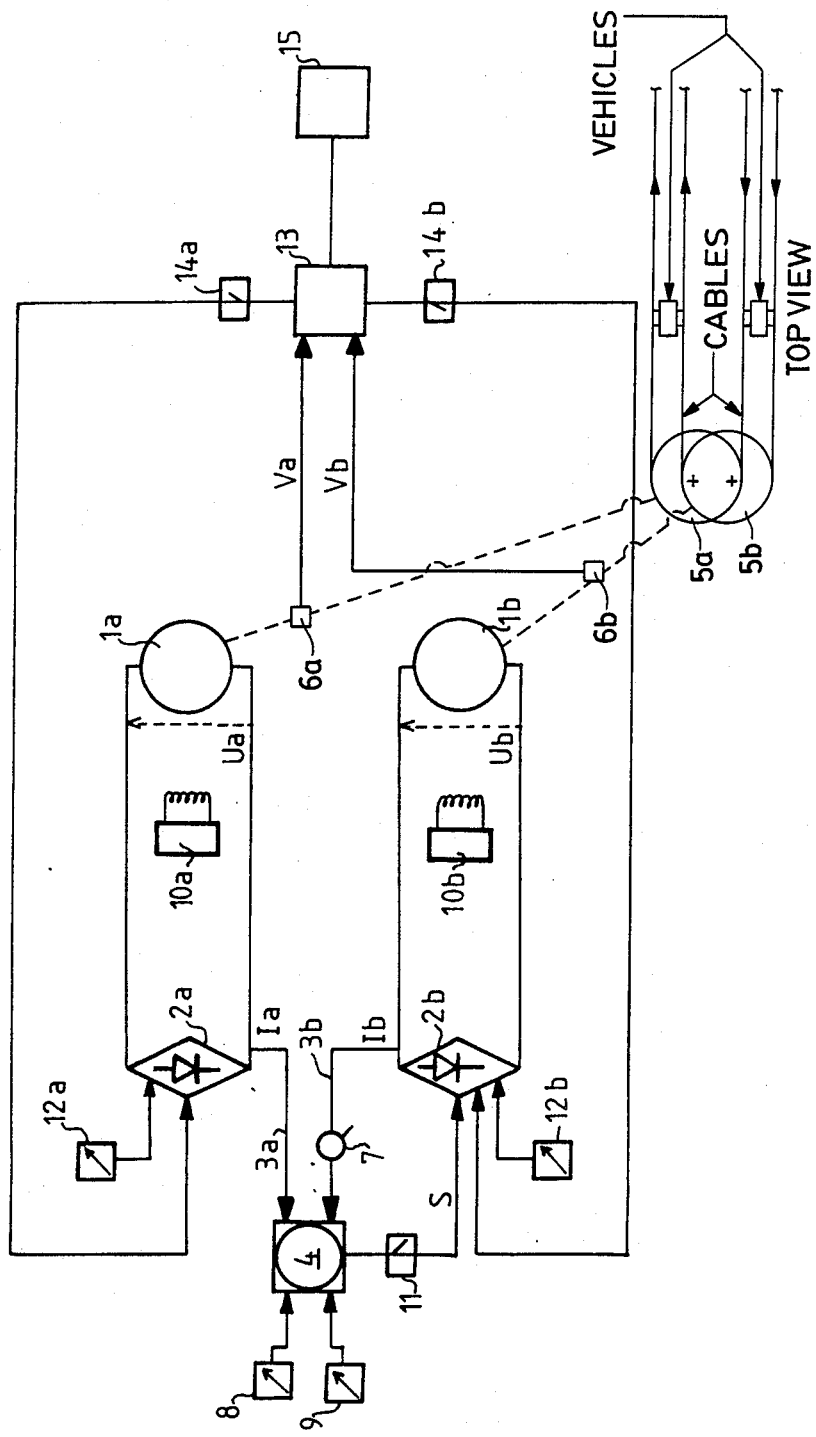
FIG. 1 is a diagram of a drive device according to an embodiment of the present invention.

Although applicable to all types of transportation installations with cables, since they comprise several parallel, at least pulling cables and in operation at least one vehicle, each vehicle being connected in line to these said at least pulling cables, the invention is more particularly intended for the drive of a transportation installation comprising two supporting/pulling, parallel, endless aerial cables. The drive device illustrated in the drawing thus makes it possible to drive such cables with continuous movement in synchronism in the same direction.

The vehicles are connected, if necessary in a releasable manner, to all the at least pulling cables and they produce a mechanical connection between these cables. Consequently, the cables move at the same speed and the pulling force for the vehicles is equally distributed between the two cables. In this case, the difference ΔE between the drive forces of the cables is the same as the initial difference ΔEo between these forces, when the cables move at the same speed, but without load, without a vehicle connected to these cables. On the other hand, when one of the cables is driven at a higher speed than the others, it withstands a greater part of the pulling force of the vehicles. In this case, the difference ΔE between the drive forces of the various cables is no longer the same as the initial difference ΔEo of the drive forces of the cables moving in synchronism, without a vehicle.

Starting from this finding, the invention thus consists of measuring the drive force of the cables and modifying the drive speed of one cable, when the difference between the drive forces varies. In particular, it is possible to reduce the drive speed of one cable which withstands too great a part of the drive force and/or increase the drive speed of a cable which withstands too small a part of the drive force.

The drive device illustrated in the drawing comprises two independent, separate drive means $1a$, $1b$ for the cables, one for each cable, two separate power sources $2a$, $2b$, supplying each drive means $1a$, $1b$ respectively independently of the other, means 3 for detecting a variation in the drive forces of the cables with respect to the initial forces for which the cables move at the same speed, which is their nominal speed and means 4 emitting at least one signal S for correcting the drive speed of at least one of the two cables, this signal S being proportional in absolute value to the variation detected in the drive forces of the cables and correcting the speed with the aim of returning the drive forces to their initial values.

Each drive means 1 is constituted by a d.c. motor rotating a drive pulley $5a$, $5b$ of one cable. Each power source 2 is constituted by an independent electrical d.c. supply—in particular comprising bridges of thyristors.

It is known that in a d.c. motor, the current I circulating in the induced circuit is proportional to the torque produced by the motor, i.e. to the drive force of the cable passing through the drive pulley set in rotation by the d.c. motor. Likewise, it is also known that the supply voltage of the induced circuit is proportional to the speed of rotation of this motor, i.e. to that of the drive pulley which is connected thereto and thus to the speed of movement of the cable passing through the drive pulley.

The transmitting means 4 are thus preferably means for transmitting at least one signal S for correcting the induced supply voltage U of at least one of the motors, this signal S being proportional in absolute value to the difference D between the measured difference ΔI between the armature currents of the two motors and the initial difference ΔIo between these currents, for which the speeds of the cables are equal, the correction of voltage being effected with the aim of cancelling-out the difference D.

If the difference $\Delta I = I_a - I_b$ increases, the correction signal S emitted by the transmitting means 4 is such that the difference $\Delta U = U_a - U_b$ between the induced supply voltages of the motors decreases, so that the difference $\Delta V = V_a - V_b$ between the speeds of the cables decreases. In fact, if ΔI increases, this means that the difference ΔE between the drive forces also increases. On account of the mechanical connection produced by the vehicles between the cables, this increase in the difference ΔE between the forces is necessarily due to an increase in the difference ΔV between the speeds.

Naturally, if vice versa ΔI decreases, the signal S is such that the difference ΔU increases so that the difference ΔV between the speeds of the cables increases.

According to the invention, the drive device comprises means $6a$, $6b$ for measuring the drive speed $V_a$, $V_b$ of the cables and means 7 for the initial regulation of the signal S emitted by the transmitting means 4, these regulating means 7 making it possible to calibrate the transmitting means 4 depending on the initial value ΔEo between the drive forces—in particular as a function of the initial value ΔIo between the armature currents.

Preferably, the means 3, 4 for controlling the speed—in particular the supply voltage—act on the drive speed of all the cables except one, the cable whereof the speed—in particular the supply voltage—is not controlled, acting as a reference and being driven at the nominal speed. For example, in the case of two cables, only one of the drive motors 1b is controlled as regards voltage by the signal S emitted by the transmitting means 4. However, the signal S is emitted as a function of the currents $I_a$, $I_b$ circulating in the two induced circuits of the two motors 1a, 1b.

Preferably, the means 4 for emitting at least one correction signal S comprise means 8 for regulating the reaction speed with which they emit a signal S after detecting a variation D.

Similarly, the means 4 for emitting at least one correction signal S comprise means 9 for regulating the amplification gain of the absolute value of the signal S as a function of the variation D. These regulating means 8, 9 make it possible to adapt the response time and the amplification gain of the transmitting means 4 as a function of the external characteristics of the transportation installation, in order to achieve a convergent automatic regulation.

The two d.c. motors 1a, 1b preferably have a separate excitation 10a, 10b. The two motors 1a, 1b are preferably identical. The excitations 10a, 10b are preferably adjustable. The electrical supplies 2a, 2b of the motors 1a, 1b are conventionally constituted by bridges of thyristors. In such bridges of thyristors, it is known that it is possible to accede directly to the current $I_a I_b$ circulating in the induced circuits. In this case, the detection means are thus constituted by simple connectors 3a, 3b connected to the bridges of thyristors 2a, 2b in order to supply to the transmitting means 4 the values of the currents $I_a$, $I_b$ circulating in the induced circuits of the two motors 1a, 1b. *The transmitting means 4 are electronic means for producing the difference $\Delta I = I_a - I_b$ between the currents supplied by the connection means 3a, 3b and for constituting a signal S proportional to the difference $\Delta I$ which they have produced.* The transmitting means 4 are thus essentially constituted by a subtractor circuit followed by an amplifier circuit. The signal S emitted by the transmitting means 4 is supplied to one 2b of the bridges of thyristors through the intermediary of a switch 11. This signal S is connected to the bridge of thyristors 2b in order to modify the output voltage $U_b$ thereof and thus the drive speed $V_b$ of the motor 1b and of the corresponding cable.

Moreover, the voltage of the bridges of thyristors 2a, 2b are controlled by manual regulating means 12a, 12b, which allow the user to vary the speed of one and/or the other of the motors 1a, 1b.

Furthermore, the means 6a, 6b for measuring the speed $V_a$, $V_b$ of the motors 1a, 1b are constituted for example by dynamotachymetric means which respectively supply the actual speed signals $V_a$, $V_b$ to a speed comparator 13. This speed comparator is also able to control the bridges of thyristors 2a, 2b, as regards voltage through the intermediary of switches 14a, 14b.

A man skilled in the art knows how to produce the various functions mentioned above by suitable electronic circuits. The various circuits making it possible to produce the means mentioned above will therefore not be described in more detail.

The drive device described above operates in the following manner:

At the time of starting-up the installation or before the vehicles are put in position and connected to the cables, the switches 11, 14a and 14b are opened so that the transmitting means 4 and the speed comparator are inactive and the motors 1a, 1b are started-up thus displaying in the regulating means 12a, 12b the desired speed which is the nominal speed of the installation. Naturally, the same speed is displayed for the regulating means 12a of one cable and for the regulating means 12b of the other cable. The switches 14a and 14b are then closed, which has the effect of bringing the speed comparator 13 into operation. If the two speeds $V_a$ and $V_b$ are equal and correspond to the nominal speed, the comparator 13 does not alter the supply voltage of the bridges of thyristors 2a, 2b. On the other hand, if one or other of the speeds $V_a$ or $V_b$ is different from the desired nominal speed, the comparator 13 will emit a corresponding signal altering the supply voltage of the corresponding bridge of thyristors 2a, 2b in order to adjust the drive speed to the desired value. The speed comparator 13 is thus also a speed corrector. Such a circuit correcting the speed of a d.c. motor depending on its actual speed measured is already prior art.

When this last operation has been carried out, one is thus certain that, without a load, the two cables move at the same speed. One then opens the switches 14a, 14b in order to disconnect the comparator 13. The switch 11 is then closed in order to supply the correction signal S to the bridge of thyristors 2b. In this situation, this signal S should be zero and should not have any effect on the bridge of thyristors 2b, since the speeds $V_a$, $V_b$ are equal and correspond to the nominal speed. Consequently, if this is not the case and if one ascertains a variation in the speed $V_b$ by virtue of the means for displaying the speed connected to the comparator 13, one acts on the means 7 for the initial regulation of the signal S in order to calibrate it to the value 0. These regulating means 7 may be constituted for example by means modifying the value of the current $I_b$ supplied to the transmitting means 4 by the detection means 3b. The regulating means 7 thus have the effect of equalizing the two currents supplied to the transmitting means 4. The calibration of these transmitting means 4 by the means 7 for regulating the initial value of the signal S may be carried out automatically by virtue of the comparator circuit 13, if means for emitting a correction signal to the regulating means 7 are provided in this comparator circuit. Calibration may also be carried out manually by acting directly on the regulating means 7 as a function of the value read on the means 15 for displaying the speed.

Such a calibration is of prime importance, since the currents $I_a$ and $I_b$ of the induced circuit of the motors are not necessarily the same when the cables move at the same speed without a load. In fact, the loops of cables are not necessarily identical.

When the calibration has been effected, the transmitting means 4 supply a zero signal S to the bridge of thyristors 2b and the speeds of movement of the two cables are the same and equal to the nominal speed displayed on the regulating means 12a, 12b. One can then connect the vehicles to the cables, either directly in the case of an installation comprising vehicles connected in a releasable manner, or by stopping the installation in the opposite case. When the vehicles are connected in line to the cables, it may happen that disturbances appear in the drive of the cables. These disturbances will be automatically detected by a variation of the induced currents $I_a$, $I_b$ and will be compensated for by the signal S supplied to the bridge of thyristors 2b and which will have the effect of altering the supply voltage $U_b$ of the motor 1b, i.e. its drive speed $V_b$ in order to reabsorb the disturbance. For example, if the cable associated with the motor 1a goes into the lead, the motor 1a will withstand a greater torque and the current $I_a$ will consequently increase. The difference $\Delta I = I_a - I_b$ will increase in proportion and thus the signal S and in a positive manner. Consequently, the supply voltage $U_b$ will increase, which will have the effect of increasing the speed $V_b$ until the cable connected to the motor 1b catches up the cable connected to the motor 1a. The other cases of the drawing can obviously be deduced from that described above.

By a method for the automatic regulation of the drive with continuous movement in synchronism in the same direction of several parallel, at least pulling cables of a transportation installation according to the invention, the difference $\Delta I$ of the currents of the two motors 1a, 1b is measured and produced, this measured difference $\Delta I$ is compared with an initial difference Io for which it has previously been determined that the speeds of the corresponding cables are the same and the supply voltage of at least one of the motors 1a, 1b is controlled in order that the measured difference $\Delta I$ remains permanently equal to the initial difference Io.

In order to determine the initial difference Eo between the forces—in particular represented by the initial difference Io between the currents—the cables are driven at the same speed without any vehicle connected to the cables, the speeds of the cables are measured and the speed of at least one cable is corrected in order that all the cables move in synchronism at a substantially constant speed equal to the nominal speed of the installation and the forces—in particular the currents—necessary for driving the cables in these conditions are measured. The calibration of the transmitting means 4 is then corrected by the regulating means 7 so that the correction signal S emitted by these transmitting means 4 is zero in these conditions.

Preferably, in one method according to the invention, the speed—in particular the supply voltage—of all the cables except one is controlled, the cable whose speed—in particular the supply voltage—is not controlled acting as a reference and being driven at the nominal drive speed of the vehicles in line. This master/slave operation is not obligatory and one can imagine that the transmitting means 4 supply two signals $S_a$, $S_b$ to the two bridges of thyristors 2a, 2b in order to control the supply voltage thereof simultaneously and in opposite directions.

The invention may be the subject of numerous variations with reference to the preferred embodiment described above, these variations being obvious to a man skilled in the art.

I claim:

1. A device for driving with continuous movement in synchronism in the same direction, several parallel, pulling cables of a transportation installation including, at least one vehicle connected in line to said pulling cables, comprising: a plurality of drive means each coupled to one of said pulling cables wherein each of said drive means generates a drive force for driving each of said pulling cables with a drive speed; a plurality of power sources each coupled to one of said drive means for supplying power to each of said drive means; and control means coupled to at least one of said power sources for regulating said drive speed of at least one of said drive means as a function of each of said drive force so as to maintain identical cable speeds in said pulling cables.

2. The device as defined in claim 1, wherein each drive means (1) includes a D.C. motor rotating a separate drive pulley (5) coupled to one of said cables; and each power source (2) includes an independent, electrical D.C. supply comprising bridges of thyristors; and wherein the device further comprises transmitting means (4) for emitting at least one signal S for correcting an induced supply voltage U for at least one of the motors, said signal S being proportional in absolute value to a difference D between a measured difference $\Delta I$ of armature currents of two motors, $I_a$ and $I_b$, and an initial difference $\Delta I_o$ between said currents, obtained when the speeds of the cables are equal, whereby voltage correction occurs by cancelling-out the difference D.

3. The device as defined in claim 2, wherein if $\Delta I = I_a - I_b$ increases, the signal S is such that a difference $\Delta U$ between induced supply voltages $U_A$ and $U_b$ of the motors decreases, whereby a difference $\Delta V$ in the speeds of each cable $V_A$ and $V_B$ decreases.

4. The device as defined in claim 1, wherein the control means controls the drive speed of all cables except one, the cable in which the speed is not controlled is driven at a nominal speed so as to act as a speed reference for all other cables.

5. The device as defined in claim 1, wherein the control means controls the power sources for the drive means of all the cables except one, the cable in which the power source is not controlled is driven at a nominal speed so as to act as a speed reference for all other cables.

6. A device for driving with continuous movement in synchronism in the same direction, two parallel, pulling, endless aerial supporting cables of a transportation installation including, at least one regularly spaced vehicle connected in line to said cables, comprising: two independent, separate drive means (1a, 1b), each coupled to one of said cables wherein each of said drive means generates a drive force for driving each of said cables with a drive speed; two separate power sources (2a, 2b) each coupled to one of said drive means for supplying power to each of said drive means (1a,1b); detecting means (3) coupled to said power source for detecting a variation of the drive force of at least one cable with respect to an initial force obtained when the cables move at a same nominal speed,; and transmitting means (4) coupled between said detecting means and one of said power sources (2b) for emitting at least one signal S for correcting the drive speed of at least one of the two cables, said signal being proportional in absolute value to the variation detected in the drive force of at least one cable and correcting the cable speed for the purpose of returning the force to its initial value.

7. The device as defined in claim 6, wherein the detecting means (3) is able to detect the variation in the force of each of the cables.

8. The device as defined in claim 7, wherein the detection means (3) detects a variation D in a difference $\Delta E$ between the drive forces of the cables with respect to an initial difference $\Delta E_o$ between said drive forces obtained when the speeds of the cables are equal and wherein the transmitting means (4) emits said speed correction signal S proportional in absolute value to said variation D, whereby a cable speed correction occurs by cancelling-out the variation D.

9. The device as defined in claim 8, further comprising velocity measuring means (6) for measuring the drive speed of the cables; and regulating means (7) for regulating the signal S emitted by the transmitting means (4), so as to enable calibration of the transmitting means (4) as a function of the initial value $\Delta Eo$ between the drive forces.

10. The device as defined in claim 8, wherein the transmitting means (4) which emits at least one correction signal S further comprises means (8) for regulating reaction speed with which the signal S is emitted after detecting the variation D.

11. The device as defined in claim 8, wherein the transmitting means (4) which emits at least one correction signal S further comprises means (9) for regulating amplification gain of the absolute value of the signal S as a function of the variation D.

12. The device as defined in claim 8, further comprising velocity measuring means (6) for measuring the drive speed of the cables; and regulating means (7) for regulating the signal S emitted by the transmitting means (4), so as to enable calibration of the transmitting means (4) as a function of an initial difference $\Delta Io$ in armature currents I between the two drive means.

13. A method for automatic regulation of a drive of a transportation installation consisting of at least one vehicle connected in line to a plurality of parallel pulling cables with continuous movement in synchronism in a same direction as said pulling cables, said method comprises the steps of: driving said cables independently of each other by drive means with a drive speed in which power is supplied by power sources belonging to each cable; measuring a force necessary for driving each of said cables; and controlling the drive speed of at least one of said cables as a function of the force measured, so as to maintain identical cable speeds in each of said cables.

14. The method as defined in claim 13, wherein each drive means includes one D.C. motor powered by one power source, said method further comprises the steps of, measuring a difference $\Delta I$ between armature currents of each motor (1$a$, 1$b$); comparing said measured difference $\Delta I$ with an initial difference $\Delta Io$ between said currents obtained when said cable speeds are identical; and controlling supply voltage from said power sources to at least one of said drive means so as to maintain the measured difference $\Delta I$ equal to the initial difference $\Delta Io$.

15. The method as defined in claim 13, in which the speed of all the cables except one is controlled, wherein said one cable is driven at a nominal drive speed so as to act as a speed reference for all other cables.

16. The method as defined in claim 13, in which supply voltage supplied from each of said power sources of all the cables except one is controlled, wherein said one cable is driven at a nominal speed so as to act as a speed reference for all other cables.

17. A method for automatic regulation of a drive of a transportation installation consisting of at least one vehicle regularly spaced along a line connected to two parallel pulling endless aerial supporting cables with continuous movement in synchronism in a same direction as said cables, said method comprises the steps of: driving each cable by a drive means with drive speed in which power is supplied by a power source belonging to each cable which are separate and independent from the drive means and the power source belonging to other cables; measuring a force necessary for driving each cable; producing a difference $\Delta E$ between said forces; comparing said difference $\Delta E$ with an initial difference value $\Delta Eo$ between said forces obtained when cable speeds are equal; and correcting the drive speed of at least one of the two cables when said difference $\Delta E$ is different from the initial difference $\Delta Eo$ so as to reestablish equality between said difference $\Delta E$ and said initial difference $\Delta Eo$.

18. The method as define in claim 17, wherein a determination of the initial difference $\Delta Eo$ between the forces comprises, driving the cables at identical speed without any vehicle connected to the cables, measuring the cable speeds, correcting the cable speed of at least one cable in order that all the cables move in synchronism at a substantially constant speed equal to a nominal speed of the installation, and measuring the forces necessary to drive the cables.

* * * * *